(12) United States Patent
Jayachandran

(10) Patent No.: US 11,769,130 B2
(45) Date of Patent: *Sep. 26, 2023

(54) METHODS AND SYSTEMS FOR DUAL-TO-SINGLE MESSAGE CONVERSION IN ELECTRONIC TRANSACTIONS

(71) Applicant: Worldpay, LLC, Symmes Township, OH (US)

(72) Inventor: Ganeshwaran Jayachandran, Acton, MA (US)

(73) Assignee: Worldpay, LLC, Symmes Township, OH (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/104,449

(22) Filed: Nov. 25, 2020

(65) Prior Publication Data

US 2021/0081918 A1 Mar. 18, 2021

Related U.S. Application Data

(63) Continuation of application No. 16/427,961, filed on May 31, 2019, now Pat. No. 10,937,014.

(51) Int. Cl.
*G06Q 20/20* (2012.01)
*G06F 9/54* (2006.01)
(Continued)

(52) U.S. Cl.
CPC .......... *G06Q 20/204* (2013.01); *G06F 9/546* (2013.01); *G06Q 20/02* (2013.01); *G06Q 20/04* (2013.01);
(Continued)

(58) Field of Classification Search
CPC ...... G06Q 20/204; G06Q 20/02; G06Q 20/04; G06Q 20/206; G06Q 20/341;
(Continued)

(56) References Cited

U.S. PATENT DOCUMENTS 8,636,203 B1 * 1/2014 Patterson ............. G06Q 20/405
235/379
10,354,247 B2 7/2019 Royyuru et al.
(Continued)

FOREIGN PATENT DOCUMENTS

WO 2019074689 A1 4/2019

OTHER PUBLICATIONS

International Search Report and Written Opinion in corresponding Application No. PCT/US2020/030590, dated Sep. 23, 2020, (13 pages).

*Primary Examiner* — Michael Jared Walker
(74) *Attorney, Agent, or Firm* — Bookoff McAndrews, PLLC

(57) ABSTRACT

Systems and methods are disclosed for electronic transaction messaging conversion. One method comprises receiving an authorization request message from a point of sale (POS) device, the authorization request message comprising transaction data associated with a transaction. Upon validating the authorization request message, a provisional authorization response message may be generated and sent to the POS device. Subsequently, a capture message may be received from the POS device, requesting clearing and settlement of the transaction. The capture message may be validated and translated to a composite message that is single-message system (SMS)-compatible. The composite message may then be sent downstream for further processing.

20 Claims, 8 Drawing Sheets

(51) Int. Cl.
*G06Q 20/04* (2012.01)
*G06Q 20/34* (2012.01)
*G06Q 20/40* (2012.01)
*G06Q 30/06* (2023.01)
*G06Q 20/02* (2012.01)

(52) U.S. Cl.
CPC ......... *G06Q 20/206* (2013.01); *G06Q 20/341* (2013.01); *G06Q 20/4014* (2013.01); *G06Q 30/06* (2013.01)

(58) Field of Classification Search
CPC .... G06Q 20/4014; G06Q 30/06; G06Q 20/22; G06Q 20/40; G06Q 20/4012; G06Q 20/20; G06F 9/546; G07F 7/088; G07F 7/122; G07G 1/0009
See application file for complete search history.

(56) References Cited

U.S. PATENT DOCUMENTS

| | | | |
|---|---|---|---|
| 2008/0249910 A1* | 10/2008 | Hill | G06Q 40/00 705/35 |
| 2008/0249928 A1* | 10/2008 | Hill | G06Q 20/10 705/39 |
| 2008/0249937 A1* | 10/2008 | Walls | G06Q 20/24 705/42 |
| 2009/0192904 A1* | 7/2009 | Patterson | G06Q 20/20 705/17 |
| 2012/0116902 A1* | 5/2012 | Cardina | G06Q 20/10 705/17 |
| 2012/0203632 A1* | 8/2012 | Blum | G06Q 30/0633 705/1.1 |
| 2012/0215604 A1* | 8/2012 | Canetto | G06Q 20/28 705/14.16 |
| 2012/0215688 A1* | 8/2012 | Musser | G06Q 20/385 705/40 |
| 2013/0054468 A1* | 2/2013 | Fuentes | G06Q 40/02 705/64 |
| 2013/0254110 A1* | 9/2013 | Royyuru | G06Q 20/386 705/44 |
| 2015/0269582 A1* | 9/2015 | Simmons | G06Q 20/42 705/44 |
| 2019/0213565 A1* | 7/2019 | Brennan | G06Q 20/20 |
| 2020/0126151 A1* | 4/2020 | Botella | G06Q 20/0855 |
| 2020/0327539 A1* | 10/2020 | Andrew | G06Q 20/023 |

* cited by examiner

METHODS AND SYSTEMS FOR DUAL-TO-SINGLE MESSAGE CONVERSION IN ELECTRONIC TRANSACTIONS

CROSS-REFERENCE TO RELATED APPLICATION(S)

This patent application is a continuation of and claims the benefit of priority to U.S. Nonprovisional patent application Ser. No. 16/427,961, filed on May 31, 2019, the entirety of which is incorporated herein by reference.

TECHNICAL FIELD

The present disclosure relates to methods and systems for electronic transaction messaging. More particularly, the technologies described herein relate to the field of routing and conversion of distinct electronic transaction message types.

BACKGROUND

Transactions, including card transactions, are used for a great number of purchases and sales between merchants and cardholders. A normal card transaction can involve a number of parties, including an account holder who possesses a card, a merchant, an acquirer processor, an issuer processor, an issuer financial institution and a card association network. Millions of such transactions occur daily at merchants using a variety of payment vehicle types, such as credit cards, debit cards, prepaid cards, digital wallets, and so forth.

Depending on the type of payment vehicle used, the transaction may be processed by the involved parties by exchanging messages in accordance with an appropriate messaging scheme. For example, in a dual-message transaction, which primarily involves signature-based transactions including credit card transactions and signature-based debit card transactions, an electronic message containing the information required for an authorization decision may be submitted at the time of purchase, and a separate electronic message containing additional data required for clearing and settlement may be submitted at a later point in time. In a single-message transaction, which primarily involves debit card transactions including both personal identification number (PIN)-based and PIN-less debit card transactions, a single electronic message containing all data required for the authorization, clearing and settlement of the transaction may be submitted at the time of purchase.

Under certain circumstances, the fees associated with the dual-message transaction may be higher compared to those associated with the single-message transaction. When a customer initiates a dual-message transaction (e.g., a credit card transaction, a signature-based debit card transaction), the issuer financial institution takes a risk by transferring the funds to the merchant and waiting to collect the funds from the consumer at a later date. The merchant may thus be subjected to a percentage fee charged by the issuer financial institution for taking such a risk and processing the transaction, in addition to the fees charged by other entities for the time and resources used to process the transaction. On the other hand, when a customer initiates a single-message transaction (e.g., a PIN-based on PIN-less debit card transaction), the customer authorizes funds to be transferred from her account to the merchant's account at the time of sale. Accordingly, routing and processing the single-message transaction (for example, in a debit network) may consume less resources, incur less fees, and may be low risk. Due to the these advantages, merchants may prefer single-message transactions over dual-message transactions. Nonetheless, certain point of sale (POS) devices may be configured for a dual-message scheme only, and it may be cumbersome for merchants to reconfigure such existing POS devices to also operate under a single-message scheme or to replace the POS devices with more advanced devices.

Thus, a need exists for seamlessly integrating a single-messaging capability with an existing device operating under a dual-message scheme. More particularly, there is a need for a mechanism that transforms messages generated under the dual-message scheme to a message compliant with the single-message scheme.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method for electronic transaction messaging conversion, comprising: receiving an authorization request message from a point of sale (POS) device, the authorization request message comprising transaction data; validating the authorization request message; storing the transaction data in a transaction data database; generating a provisional authorization response message; sending the provisional authorization response message to the POS device; receiving a capture message from the POS device, the capture message having been generated by the POS device in response to the provisional authorization response message; validating the capture message; translating the capture message to a composite message, the composite message being single-message system (SMS)-compatible; and sending the composite message to a payment network.

One embodiment provides a system for electronic transaction messaging conversion. The system may comprise one or more processors; and a non-transitory computer readable medium storing instructions which, when executed by the one or more processors, cause the one or more processors to perform: receiving an authorization request message from a point of sale (POS) device, the authorization request message comprising transaction data; validating the authorization request message; storing the transaction data in a transaction data database; generating a provisional authorization response message; sending the provisional authorization response message to the POS device; receiving a capture message from the POS device, the capture message having been generated by the POS device in response to the provisional authorization response message; validating the capture message; translating the capture message to a composite message, the composite message being single-message system (SMS)-compatible; and sending the composite message to a payment network.

One embodiment provides a non-transitory computer readable medium for electronic transaction messaging conversion. The non-transitory computer readable medium may store instructions that, when executed by one or more processors, cause the one or more processors to perform: receiving an authorization request message from a point of sale (POS) device, the authorization request message comprising transaction data; validating the authorization request message; storing the transaction data in a transaction data database; generating a provisional authorization response message; sending the provisional authorization response message to the POS device; receiving a capture message from the POS device, the capture message having been generated by the POS device in response to the provisional authorization response message; validating the capture message; translating the capture message to a composite message, the composite message being single-message system (SMS)-compatible; and sending the composite message to a payment network.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
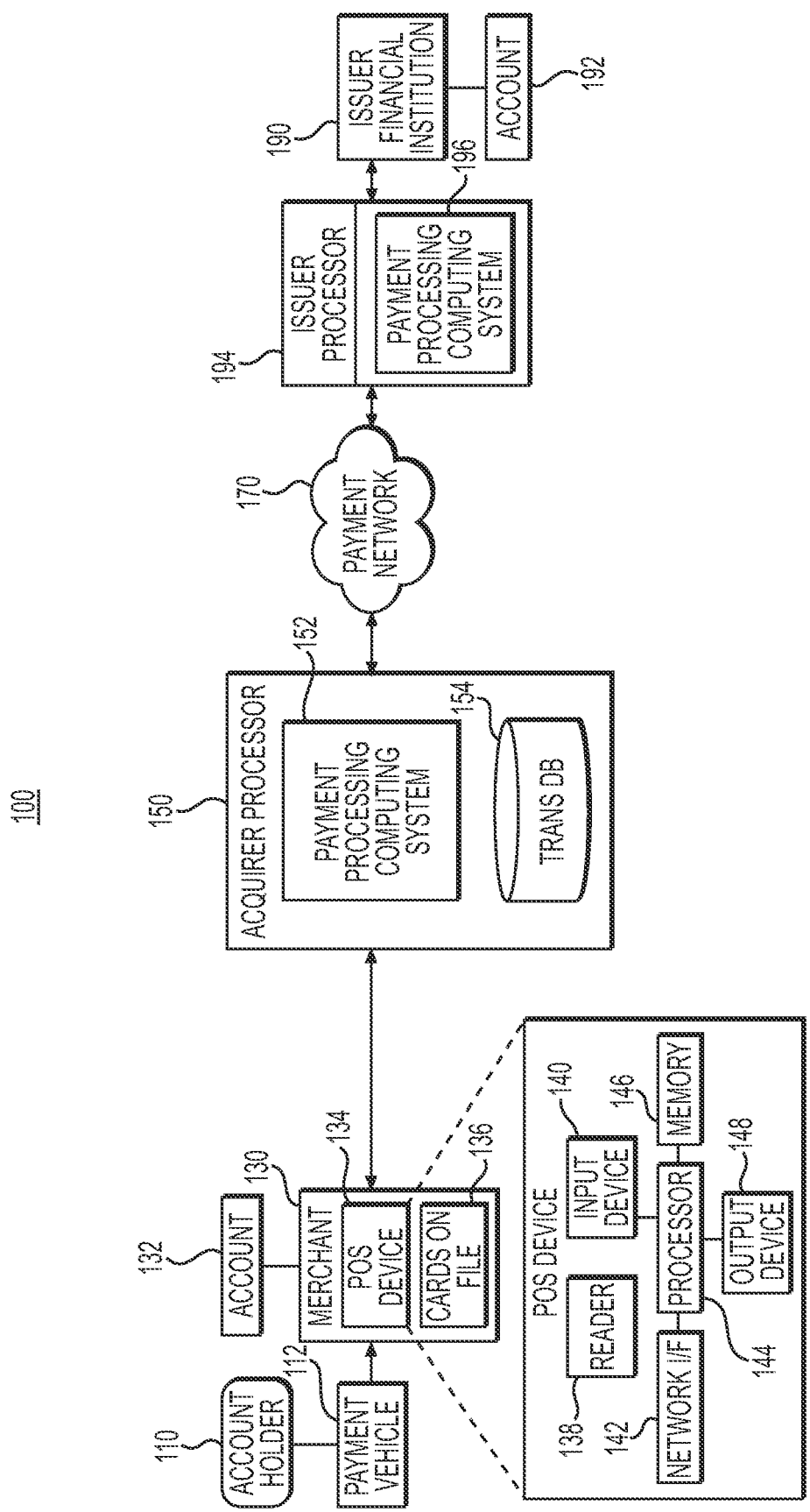
FIG. 1 depicts a block diagram of an exemplary payment system, according to one aspect of the present disclosure.

The following embodiments describe methods and systems for electronic transaction messaging. More particularly, the technologies described herein relate to the field of routing and conversion of distinct electronic transaction message types.

The disclosed embodiments are directed to enabling a dual-message transaction to be converted and processed under a single-message scheme, and/or to be routed to a debit network in order to reap the benefits of the debit network. Notably, the conversion from a dual-message transaction to a single-message transaction may be accomplished without updating, reconfiguring, and/or replacing the POS device, which may initially generate transaction messages under a dual-message scheme. In one embodiment, a first transaction message comprising an authorization request message may be received and validated. The transaction data contained in the authorization request message may be stored in a database. Then, a provisional authorization response message may be generated and sent to the POS device. At a later time, a second transaction message comprising a capture message may be received and validated. The capture message may be translated to a composite message conforming to a single-message scheme. The composite message may be sent downstream for further processing. The particulars of the disclosed embodiments will be described in greater detail in the following sections.

Various non-limiting embodiments of the present disclosure will now be described to provide an overall understanding of the principles of the structure, function, and use of systems and methods disclosed herein for electronic transaction messaging conversion. One or more examples of these non-limiting embodiments are illustrated in the selected examples disclosed and described in detail with reference made to FIGS. 1-8 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment,"

"some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

Referring now to the appended drawings, FIG. 1 depicts a block diagram of an exemplary payment system, according to one aspect of the present disclosure. In the payment system 100, a payment vehicle 112 may be issued to an account holder 110 by an issuer financial institution 190. The issuer financial institution 190 may be any of a variety of financial institutions that is capable of issuing a payment vehicle to an account holder 110. The payment vehicle 112 may be used to pay a merchant 130 for a purchase transaction at a point of sale (POS) device 134. The POS device 134 may be any device that facilitates receipt of a payment vehicle for payment of a purchase, such as for example, a POS terminal or a web interface. Further, it is to be appreciated that the merchant 130 may be any type of merchant system or service provider system, such as a brick-and-mortar merchant system, an online merchant system (e.g., a merchant server, an electronic commerce (e-commerce) server, etc.), a mobile merchant system, a kiosk system, or any other type of merchant system or device configured to receive payment cards from account holders as a form of payment. Therefore, the merchant 130 may also be referred to as a merchant system 130 in the present disclosure.

The POS device 134 may be configured to interact with the payment vehicle 112 to obtain account information about a consumer account affiliated with the account holder 110. In one embodiment, the POS device 134 may include a memory 146 coupled to the processor 144, which controls the operations of a reader 138, an input device 140, an output device 148 and a network interface 142. The memory 146 may store instructions for the processor 144 and/or data, such as an identification that is associated with the merchant account 132.

In one embodiment, the reader 138 may include a magnetic strip reader. In another embodiment, the reader 138 may include a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, and so forth.

In one embodiment, the input device 140 may include key buttons that can be used to enter the account information directly into the POS device 134 without the physical presence of the payment vehicle 112. The input device 140 may be configured to provide further information to initiate a transaction, such as a personal identification number (PIN), password, zip code, etc., or in combination with the account information obtained from the payment vehicle 112. In one embodiment, the output device 148 may include a display, a speaker, and/or a printer to present information, such as the result of an authorization request, a receipt for the transaction, an advertisement, and so forth.

In one embodiment, the network interface 142 may be configured to communicate with the acquirer processor 150 via a telephone connection, an Internet connection, or a dedicated data communication channel.

In one embodiment, the instructions stored in the memory 146 may be configured at least to cause the POS device 134 to send an authorization request message to the acquirer processor 150 to initiate a transaction. The POS device 134 may or may not send a separate request for the clearing and settling of the transaction.

For example, under a dual-message scheme, a separate request for the clearing and settling of the transaction may be generated and sent by the POS device 134 following the transmission of the authorization request message. The request for the clearing and settling of the transaction may be referred to as a capture message throughout this disclosure. A capture message may contain information needed by different entities of the payment system 100 to clear and settle the transaction. The dual-message scheme may be used to process signature-based transactions (e.g., credit card transactions and signature-based debit card transactions), and may sometimes be associated with higher fees compared to those of a single-message scheme, especially for transactions involving large purchases. The higher fees may be due to the higher risk involved with credit card transactions and/or more complex routing and processing of the messages under the dual-message scheme.

Under a single-message scheme on the other hand, a separate request may not be generated. Instead, a single payment processing request for both the authorization and capture (i.e., clearing and settlement) may be generated and sent by the POS device 134 at the time of sale. In other words, the authorization request message initially sent to the acquirer processor 150 may also contain information needed for clearing and settling of the transaction. The single-message scheme may be used to process PIN-based or PIN-less debit card transactions, and may provide access to debit networks. The account holder 110 may authorize funds to be transferred to the account 132 of the merchant 130 at the time of the payment transaction. Such a single payment processing request for both the authorization and capture may be referred to as a composite message throughout this disclosure. Under certain circumstances (e.g., large purchases), single-message transactions may incur lower fees compared to those of the dual-message transactions, given the lower risk and/or less rigorous routing and processing of the messages.

As alluded to above, signature-based transactions, for which a dual message scheme may be utilized, may include credit card transactions and signature-based debit card transactions. A signature-based debit card transaction may also be referred to as a signature-based debit transaction, an offline debit card transaction, an offline debit transaction, etc. A signature-based debit card transaction may work like a normal credit card transaction and may require a customer signature, not a PIN, which authorizes the merchant to collect appropriate funds from that customer's bank account, usually one to several days after the payment is made. A signature-based debit card transaction may use a credit card network rather than a debit network, and may utilize a dual message scheme as discussed above.

Debit card transactions, for which a single message scheme may be utilized, may include PIN-based and PIN-less debit card transactions. A PIN-based debit card transaction may require a customer to enter a PIN, which authorizes immediate withdrawal of funds from the customer's account. A PIN-less debit card transaction may allow a debit card transaction to be processed without requiring the customer to enter a PIN. For instance, a PIN-less debit card transactions may allow a customer to make a payment without providing a PIN, using the same debit card they otherwise would use at an automated teller machine (ATM) with a PIN, at a POS device with a signature or PIN, etc. Each individual merchant location may need to agree to participate in the PIN-less debit card transactions and to use POS devices certified for PIN-less debit card transactions. As alluded to above, these types of debit card transactions (i.e., PIN-based and PIN-less debit card transactions) may be routed to a debit network, for which a single message scheme may be utilized.

It should be noted that, although the present disclosure describes that the signature-based transactions may be processed under the dual message scheme and the PIN-based/PIN-less debit transactions may be processed under the single message scheme based on the current landscape of the payment processing technology, the message scheme used for the respective transaction types may not be limited in the manner explicitly described herein. In other words, the signature-based transactions could also be processed under the single message scheme, and the PIN-based/PIN-less debit transactions could also be processed under the dual message scheme, depending on the arrangements and configurations agreed to by the involved parties (e.g., merchants, acquirers, payment networks, issuers, etc.) on the message schemes used with respect to the respective transaction types. Therefore, the message conversion technique discussed in the present disclosure should be considered broadly as a way to convert a dual message to a single message, and should not be viewed in a limiting sense such as, for example, only to convert a message used in a credit transaction to a message used in a PIN-based or PIN-less debit transaction.

The messages exchanged between the entities in the payment network 100 may be in conformance with the ISO 8583 standard. ISO 8583 is an international standard for financial transaction payment vehicle originated interchange messaging, which defines a message format and a communication flow so that different entities can exchange the transaction requests and responses. In general, an ISO 8583 message may consist of three parts, namely a message type indicator (MTI), one or more bitmaps, and one or more data elements. The MTI indicates the overall purpose and function of the message as well as the origin. The bitmaps indicate which data elements are present in the message. The data elements may be the individual fields carrying the transaction information.

It should noted that, although the present disclosure describes the POS device 134, or POS device 234 discussed in the following sections, as the component that transmits messages to and receives messages from the acquirer processor 150, the merchant system 130 may also have other components configured to transmit, receive, and process messages. Therefore, it should be understood that the messages described in the present disclosure to be handled by the POS device 134 or 234 may also be handled by another component within the merchant system 130. Accordingly, it should be understood that the merchant system 130 in general may generate, process, transmit, and receive messages, and the message handling at the merchant system 130 may not be limited only to the POS device 134 or 234.

The instructions stored in the memory 146 may also be configured to cause the POS device 134 to perform other types of functions discussed in this description.

In one embodiment, a POS device 134 may have fewer components than those illustrated in FIG. 1. For example, in one embodiment, the POS device 134 may be configured for "card-not-present" transactions; and the POS device 134 may not have a reader 138. In one embodiment, a POS device 134 may have more components than those illustrated in FIG. 1.

During a purchase event, the POS device 134 may send an authorization request message for the purchase transaction to an acquirer processor 150 that processes payment vehicle transactions for the merchant 130. As is to be appreciated, additional intermediary entities, such as one or more payment gateways, may assist with the handling and routing of the authorization request message or other related messaging. For the purposes of illustration, such intermediary entities may be considered part of the acquirer processor 150. The authorization request message may include identifying information from the payment vehicle 112, such as a bank identification number (BIN), a primary account number (PAN), an expiration date, and a first and last name of the account holder 110, for example. The authorization request message may also include identifying information from the purchase such as a transaction amount and identifying information from the POS device 134 (e.g., a POS identifier) and/or the merchant 130 (e.g., a merchant identifier), for example.

In some embodiments, the payment vehicle 112 may be used to establish a recurring billing arrangement between the account holder 110 and the merchant 130. An initial transaction may allow the merchant 130 to store account information which can be used for subsequent billing events. The account information may be stored in the cards-on-file storage 136. For example, the purchase event illustrated in FIG. 1 may be associated with a subscription, membership plan, installment payment plan between the merchant 130 and the account holder 110. For subsequent transactions, the merchant 130 may access the cards-on-file storage 136 to retrieve the relevant account information. The subsequent transactions may not necessarily need direct involvement from the account holder 110. In other embodiments, the account holder 110 may trigger the subsequent transaction, but may not provide the payment vehicle 112 to the merchant 130, as the merchant 130 has access to the cardholder's account information in the cards-on-file storage 136.

A payment processing computing system 152 at the acquirer processor 150 may receive the authorization request message from the merchant 130. The payment processing computing system 152 may translate the authorization request message, if necessary, and can provide the authorization request message to a payment network 170. The payment network 170 may be, for example, a network of a credit or debit card association affiliated with the payment vehicle 112. Non-limiting examples of credit card associations include VISA, MASTERCARD, DISCOVER, AMERICAN EXPRESS, etc. and non-limiting examples of debit card associations include NYCE, STAR, ACCEL, INTERLINK, etc. The authorization request message may then be provided to a payment processing computing system 196 at an issuer processor 194. In response to receiving the authorization request message, and based on the type of payment vehicle 112, the payment processing computing system 196 may provide the authorization request message to the issuer financial institution 190. Using information from the authorization request message, the issuer financial institution 190 may associate the purchase transaction with an account 192 of the account holder 110 held by the issuer financial institution 190. The issuer financial institution 190 may then send an authorization response message which can either approve or deny the transaction. The authorization response message may be provided to the payment processing computing system 196 at the issuer processor 194 and then provided to the payment network 170. The authorization response message may then be provided to the payment processing computing system 152 at the acquirer processor 150. Upon receiving the authorization response message, the payment processing computing system 152 may send either an approval message or a denial message to the POS device 134 to complete the purchase transaction. If the purchase transaction is approved, it may be posted to the account holder's account 192 and reconciled later with the account holder 110 and the merchant 130. As alluded to above, under a dual-message scheme, the POS device 134 (i.e., the merchant 130) may initiate the clearing (including reconciling) and settlement phase by sending a capture message to the acquirer processor 150.

Transaction records may be stored in one or more locations within the system 100. In one embodiment, the transaction records may be stored within a transaction data database 154 of the acquirer processor 150. The transaction data forming the transaction records may be received by the transaction data database 154 from various sources, such as the POS device 134, the merchant 130, the acquirer processor 150, and so on. A plurality of transaction parameters associated with the purchase transaction may be stored in each transaction record which can generally be used for settlement and financial recordkeeping. While the transaction parameters stored in each transaction record can vary, example transaction parameters may include, without limitation, an account number, a card number, payment vehicle information, product information (such as product type, product serial number, and so forth), a transaction amount, loyalty account information, merchant information, a transaction amount, a response code, a transaction date, a transaction time, whether the transaction was a "card present" transaction, and so on.

As alluded to above, transactions being processed under a dual-message scheme may sometimes incur higher fees for the merchants. If the POS device 134 of a merchant 130 is solely configured for the dual-message scheme, the merchant 130 may need to update/re-code the POS device 134 or replace the POS device 134 with an updated version, in order to process transactions using a single-message scheme. It may be extremely cumbersome for merchants to update or replace the POS device 134 when there is a constant flow of transactions to be processed by the device 134. By using the technique discussed in the current disclosure, merchants will be able to retain the dual-message setup of the POS devices 134 and still reap the benefits of the single-message scheme without making any modifications to the existing dual-message setup. More specifically, the merchants will be able to access debit networks and reduce transaction-associated costs without having to upgrade or replace the POS devices 134 for the single-message capability.

Figure 2:
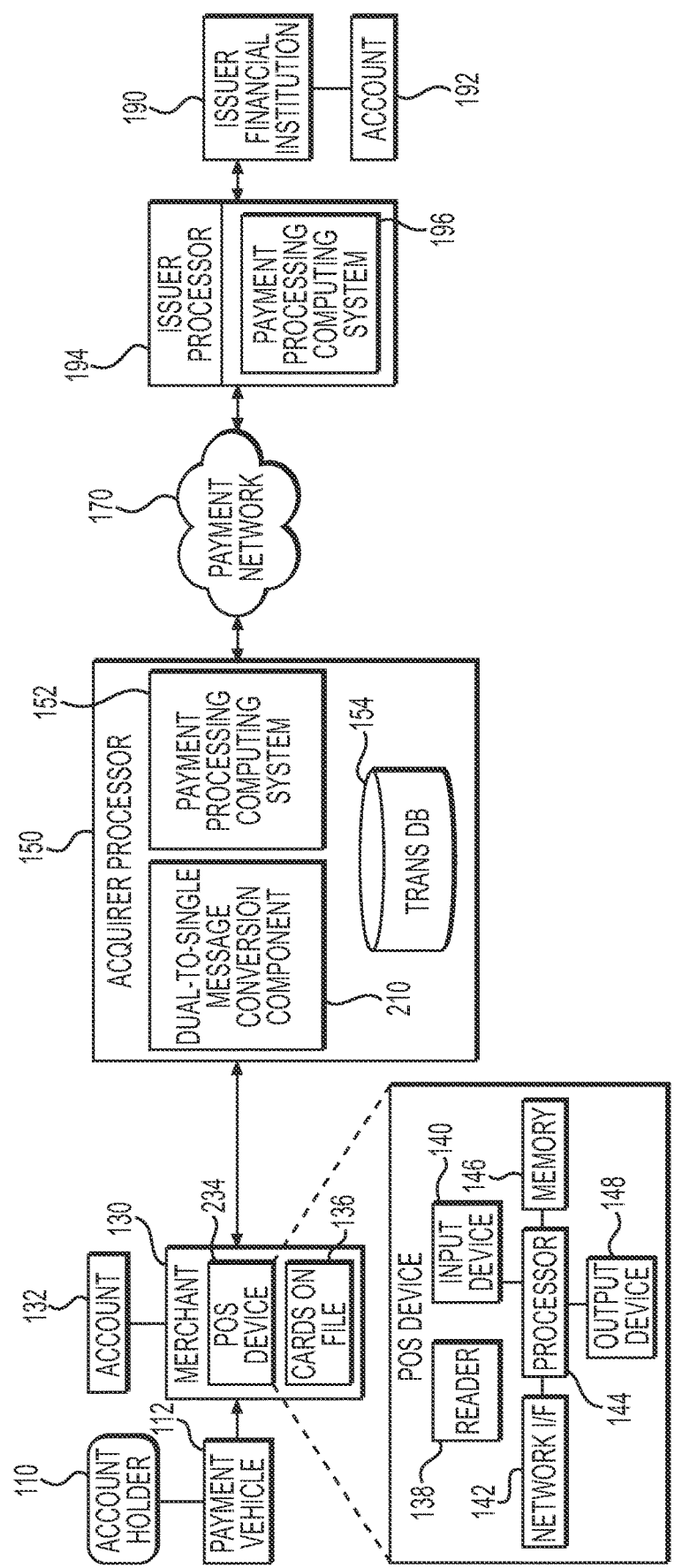
FIG. 2 depicts a block diagram of another exemplary payment system, according to one aspect of the present disclosure.
Figure 3:
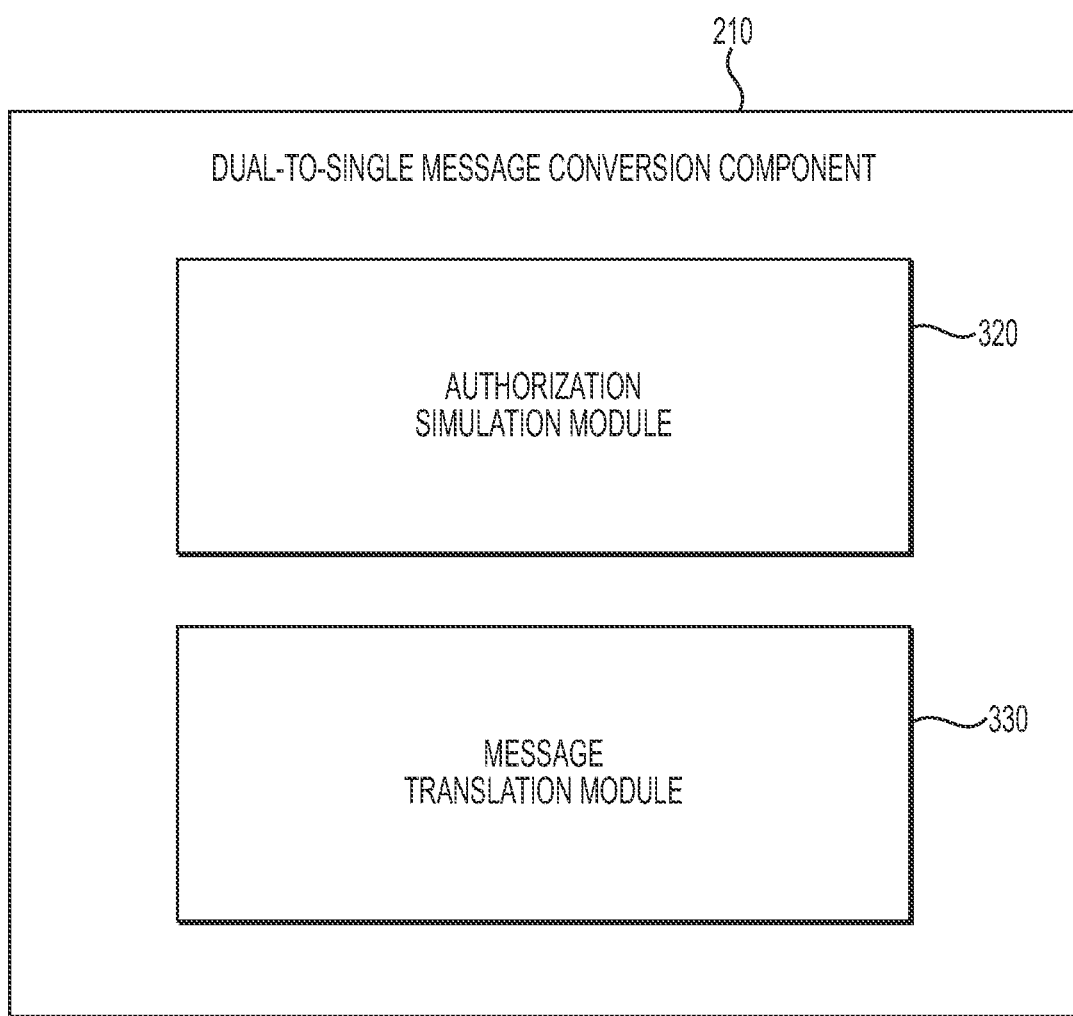
FIG. 3 depicts a block diagram of a dual-to-single message conversion component, according to one aspect of the present disclosure.

FIG. 2 depicts a block diagram of another exemplary payment system, according to one aspect of the present disclosure. The payment system 200 largely comprises the entities and corresponding components discussed above in reference to the payment system 100 depicted in FIG. 1. However, in contrast to the payment system 100, the payment system 200 may include a POS device 234 that is configured to generate messages under a dual-message scheme only (e.g., primarily configured for signature-based transactions such as, e.g., credit card transactions and signature-based debit card transactions), and may include an acquirer processor 150 implemented with a dual-to-single message conversion component 210. The dual-to-single message conversion component 210 may be implemented in order to solve the technical problems or limitations discussed above in reference to FIG. 1. More particularly, the dual-to-single message conversion component 210 may enable at least a portion of the payment system 200 to operate under a single-message scheme, while retaining the dual-message setup of the POS device 234 and without having to reconfigure the POS device 234 for the single-message capability. For example, the dual-to-single message conversion component 210 may enable the acquirer processor 150 to receive a dual message (i.e., an authorization request message and a capture message) from the POS device 234 and output a single message (i.e., a composite message) to the payment network 170. FIG. 3 depicts a block diagram of the dual-to-single message conversion component 210, according to one aspect of the present disclosure. In general, the dual-to-single message conversion component 210 may include an authorization simulation module 320 and a message translation module 330. In the discussion below, reference will be made to both FIG. 2 and FIG. 3.

During a purchase event in which the account holder 110 elects a PIN-based or PIN-less debit payment for example, the POS device 234 may send an authorization request message for the purchase transaction to an acquirer processor 150 that processes payment vehicle transactions for the merchant 130. The dual-to-single message conversion component 210, or the authorization simulation module 320 thereof may receive the authorization request message from the POS device 234. The received authorization request message may be dual-message system (DMS)-compatible.

In some embodiments, the dual-to-single message conversion component 210 may first determine whether the authorization request message is eligible for dual-to-single message conversion (e.g., if the authorization request message is for a PIN-based or PIN-less debit card transaction). If the authorization request message is ineligible for dual-to-single message conversion (e.g., if the authorization request message is for a signature-based transaction such as a credit card transaction or a signature-based debit card transaction), the received authorization request message may be processed in accordance with the dual-message scheme, and may thus be logged and forwarded to entities downstream for an authorization response (e.g., a regular credit authorization). On the other hand, if the authorization request message is eligible for dual-to-single message conversion (e.g., if the authorization request message is for a PIN-based or PIN-less debit card transaction), the received authorization request message may be processed by the authorization simulation module 320 of the dual-to-single message conversion component 210, as discussed below in greater detail.

The receipt of the eligible authorization request message at the dual-to-single message conversion component 210 marks the beginning of an authorization simulation stage, which may be performed by the authorization simulation module 320. The authorization simulation module 320 may then validate the received authorization request message. The validation may include, but may not limited to, running a mod check on the payment vehicle information (e.g., credit/debit card number or primary account number) contained in the authorization request message, running a credit/security check on the account holder 110, and so forth. In some embodiments, the mod check may be performed using the Luhn algorithm, which is a checksum formula known as the modulus 10 or mod 10 algorithm used to validate a variety of identification numbers including, but not limited to, credit/debit card numbers.

Once the authorization request message has been validated, the transaction data in the authorization request message may be stored in the transaction data database 154 as a transaction record. As alluded to above, each transaction record may comprise transaction parameters such as, e.g., a transaction amount, a transaction time, a payment vehicle information, a product/purchase information, a credit/debit card number or primary account number (PAN), an expiration date, a merchant identifier, a bank identification number (BIN), etc. Upon storing the transaction data, the authorization simulation module 320 may generate and send a provisional authorization response message to the POS device 234. The authorization simulation module 320 may also generate a unique identifier for the provisional authorization response message, and include the unique identifier in the provisional authorization response message sent to the POS device 234. Further, the provisional authorization response message and the unique identifier may be stored in the transaction data database 154 in association with or linked to the transaction record that corresponds to the previously-received authorization request message. The transmission of the provisional authorization response message to the POS device 234 marks the end of the authorization simulation stage.

Notably, the authorization simulation module 320 completes the first stage of converting a dual message to a single message. As explained above, during the authorization simulation stage, the authorization request message may be processed by the dual-to-single message conversion component 210 and may not be routed to other entities downstream such as, e.g., the payment network 170, the issuer processor 194, and the issuer financial institution 190. Instead, the authorization simulation module 320 may generate and send a provisional authorization response message based on the authorization request message, essentially "simulating" the processing of the authorization request message usually performed by the entities downstream. The provisional authorization response message may be used to invoke the POS device 234 to generate a capture message, and may not necessarily suggest that the transaction has been authorized by the issuer financial institution 190. Therefore, the POS device 234, in response to receiving the provisional authorization response message, may not display any indication that the transaction has been authorized, and may use the provisional authorization response message to generate a capture message internally. In other words, the transaction may still be marked as outstanding or pending by the POS device 234 even after the provisional authorization response message is received.

It should also be noted that an authorization reversal request message may be processed by the authorization simulation module 320 similarly to the authorization request message. An authorization reversal request is a request to cancel a transaction that is marked outstanding or pending. Upon receipt of such an authorization reversal request message, the authorization simulation module 320 may determine whether a provisional authorization response message has been generated for the transaction indicated in the authorization reversal request message. This determination may be made by comparing a unique identifier contained in the authorization reversal request message against the unique identifier stored in the transaction data database 154. If the unique identifies match, the authorization reversal request message may be processed in a manner similar to that of the authorization request message processing discussed above, and a provisional authorization reversal response message may be transmitted to the POS device 234 upon successful validation and logging of the authorization reversal request message.

With continuing reference to FIG. 2 and FIG. 3, upon receiving the provisional authorization response message, the POS device 234 may generate and send a capture message to the acquirer processor 150. The dual-to-single message conversion component 210, or the message translation module 330 thereof may receive the capture message from the POS device 234. The capture message may be DMS-compatible. The receipt of the capture message at the dual-to-single message conversion component 210 marks the beginning of a message translation stage, which may be performed by the message translation module 330. The message translation module 330 may validate the received capture message by referencing back to the corresponding provisional authorization response message, the record of which has been stored in the transaction data database 154 prior to the transmission of the provisional authorization response message. The provisional authorization response message as well as the transaction record that corresponds to the previously-received authorization request message may be retrieved by using the unique identifier associated with the provisional authorization response message. Therefore, the received capture message may include the unique identifier associated with the provisional authorization response message, as well as the information needed for clearing and settlement.

The validation process may ensure that the information contained in the capture message is consistent with the transaction data associated with the provisional authorization response message. For example, the message translation module 330 may compare the transaction amount in the capture message to the transaction amount in the provisional authorization response message, and may ensure that the amount to be captured does not exceed the amount authorized by the provisional authorization response message. In some embodiments, the message translation module 330 may support multiple captures with varying amounts, but the total amount to be captured may not be allowed to exceed the amount authorized in the provisional authorization response message. In other words, the message translation module 330 may receive multiple capture messages with varying amounts, the multiple capture messages being associated with a provisionally-authorized transaction. However, the total of the amounts indicated in the capture messages may not be allowed to exceed the provisionally-authorized amount indicated in the provisional authorization response message.

Upon successful validation, the message translation module 330 may translate the capture message to a composite message conforming to the single-message scheme, for further downstream processing. Such a composite message may be characterized as being single-message system (SMS)-compatible throughout the current disclosure. The translation of the capture message to the composite message may involve converting a message type indicator of the capture message to a message type indicator corresponding to the composite message, merging at least a portion of the transaction data retrieved during the validation step 515 with the transaction clearing and settlement data in the capture message, and inserting the message type indicator corresponding to the composite message and the merged transaction and transaction clearing and settlement data in the composite message. The generated composite message may be transmitted from the dual-to-single message conversion component 210 to the payment processing computing system 152 of the acquirer processor 150, and subsequently to the payment network 170 for further processing. In some embodiments, prior to being transmitted to the payment network 170, the generated composite message may be transmitted to and processed by a least cost routing engine configured to determine a route that may be least costly for the merchant. The determined route may be used to transmit the composite message to an entity or entities (e.g., a debit network) associated with the least cost. The message translation module 330 thus completes the second stage of converting a dual message to a single message. As a result, the payment processing computing system 152 of the acquirer processor 150 as well as one or more other entities downstream (e.g., payment network 170, issuer processor 194, issuer financial institution 190) can process the composite message under the single-message scheme, as if the single-message scheme has been utilized all the way from the starting point of the transaction (i.e., POS device 234).

After the composite message has been processed by the entities downstream, the message translation module 330 may receive a first final authorization response message (or a final decline message) from downstream. Because any message received from downstream could be under a single-message scheme (i.e., SMS-compatible), the message translation module 330 may be configured to translate such an SMS-compatible message to a DMS-compatible message. For instance, the message translation module 330 may translate the first final authorization response message that is SMS-compatible to a second final authorization response message that is DMS-compatible, and send the second final authorization response message to the POS device 234. The translation of the first final authorization response message to the second final authorization response message may involve converting the message type indicator of the first final authorization response message to a message type indicator corresponding to the second final authorization response message, and inserting the converted message type indicator in the second final authorization response message. Upon receiving the second final authorization response message, the POS device 234 may mark the transaction as complete and display an indication that the transaction has been authorized and processed.

As alluded to above, the messages exchanged between entities in the payment system 200 may be in ISO 8583 format. Assuming the messages discussed in the current disclosure are in ISO 8583 format, the following table shows an exemplary message format indicator of each message received and output by the dual-to-single message conversion component 210.

| Message | Message Type Indicator (MTI) | Usage |
| --- | --- | --- |
| Authorization Request Message | x100 | An authorization request from a POS device for authorization of an account holder purchase |
| Provisional Authorization Response Message | x110 | An authorization response to a POS device for authorization of an account holder purchase |
| Capture Message | x220 | A financial accumulation presentment message used to complete transactions initiated with an authorization request (usually used in combination with an x100 message) |
| Composite Message | x200 | A financial presentment message used to complete a transaction by transferring money from one account to another |

-continued

| Message | Message Type Indicator (MTI) | Usage |
| --- | --- | --- |
| First final authorization response message | x210 | An issuer response to a financial presentment message |
| Second final authorization response message | x230 | An issuer response to a financial accumulation presentment message |

Figure 4:
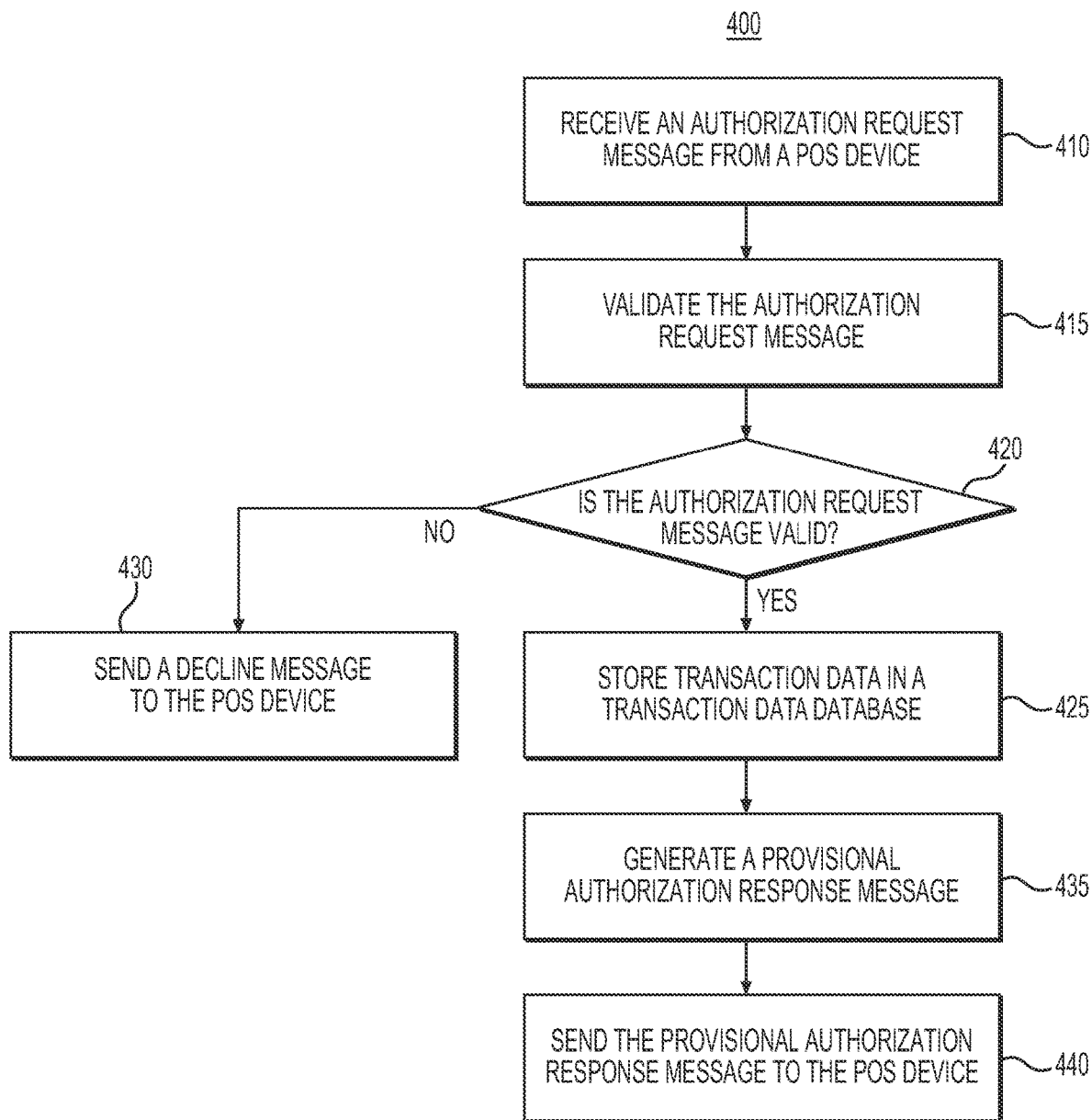
FIG. 4 depicts a flowchart of an exemplary method of generating a provisional authorization response message, according to one aspect of the present disclosure.
Figure 5:
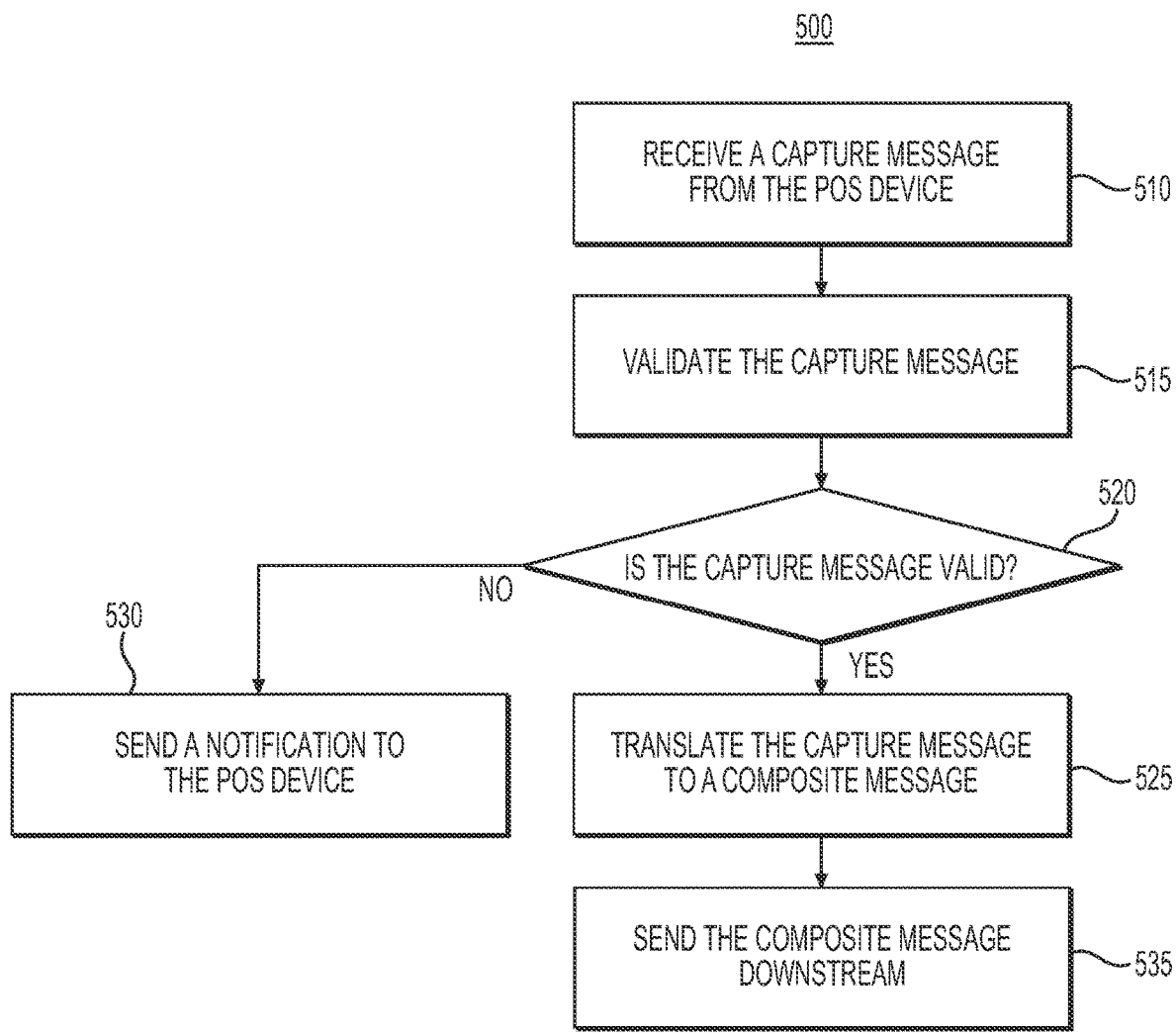
FIG. 5 depicts a flowchart of an exemplary method of translating a capture message to a composite message, according to one aspect of the present disclosure.

FIG. 4 depicts a flowchart of an exemplary method of generating a provisional authorization response message, according to one aspect of the present disclosure. In particular, method 400 may be performed by the authorization simulation module 320 of the dual-to-single message conversion component 210. FIG. 5 depicts a flowchart of an exemplary method of translating a capture message to a composite message, according to one aspect of the present disclosure. In particular, method 500 may be performed by the message translation module 330 of the dual-to-single message conversion component 210. Therefore, method 400 and method 500 may together describe the dual-to-single message conversion process performed by the dual-to-single message conversion component 210.

With reference to FIG. 4, at step 410, the authorization simulation module 320 may receive an authorization request message from a POS device 234. As alluded to above, in some embodiments, the authorization request message may be received from a merchant system 130 in general. At step 415, the authorization simulation module 320 may validate the authorization request message. At step 420, if it is determined that the authorization request message is not valid, the method 400 may proceed to step 430 where the authorization simulation module 320 may send a decline message to the POS device 234 (or the merchant system 130). The decline message may indicate that the authorization request message has been declined. At step 420, it if is determined that the authorization request message is valid, the method 400 may proceed to step 425. At step 425, the authorization simulation module 320 may store transaction data in the authorization request message in a transaction data database 154. At step 435, the authorization simulation module 320 may generate a provisional authorization response message. At step 440, the authorization simulation module 320 may send the provisional authorization response message to the POS device 234 (or the merchant system 130). The POS device 234 (or the merchant system 130) may receive the provisional authorization response message and may later generate a capture message for clearing and settling the transaction. As explained above, the authorization request message and the capture message may be generated by the POS device 234 (or the merchant system 130) in accordance with a dual-message scheme, and may together be referred to as a dual-message.

As alluded to above, an authorization reversal request message may also be processed in a manner similar to that of the method 400. In other words, the steps described in the method 400 may similarly be performed for an authorization reversal request message. For instance, upon receiving the authorization reversal request message, the authorization simulation module 320 may determine whether a provisional authorization response message has been generated for the transaction indicated in the authorization reversal request message. If not, a decline message is sent to the POS device 234 (or the merchant system 130). If it is determined that a provisional authorization response message has been generated, the authorization simulation module 320 may validate the authorization reversal request message based on the validation method discussed above with respect to the authorization request message. If the authorization reversal request message is not valid, a decline message is sent to the POS device 234 (or the merchant system 130). If the authorization reversal request message is valid, the authorization simulation module 320 may log the authorization reversal request message in (or in association with) the corresponding transaction record in the transaction data database 154. The authorization simulation module 320 may then generate and send a provisional authorization reversal response message to the POS device 234 (or the merchant system 130).

Now with reference to FIG. 5, at step 510, the message translation module 330 may receive a capture message from the POS device 234 (or the merchant system 130). At step 515, the message translation module 330 may validate the capture message by referencing back to the provisional authorization response message generated and sent to the POS device 234 (or the merchant system 130) at steps 435 and 440 in FIG. 4. At step 520, if is determined that the capture message is not valid, the method 500 may proceed to step 530 where the message translation module 330 may send a notification to the POS device 234 (or the merchant system 130), indicating that the capture message does not match the provisional authorization response message, or that the contents of the capture message are not consistent with the contents of the authorization request message that was previously authorized and stored in the transaction data database 154. At step 520, if it is determined that the capture message is valid, the method 500 may proceed to step 525. At step 525, the message translation module 330 may translate the capture message to a composite message conforming to a single message scheme. At step 535, the message translation module 535 may send the composite message downstream, such as, e.g., to the payment processing computing system 152 of the acquirer processor 150, or to the payment network 170. In some embodiment, as alluded to above, prior to sending the composite message to the payment network 170, the composite message may be processed by a least cost routing engine, and may subsequently be sent to an entity or entities associated with the least cost as determined by the least cost routing engine.

Figure 6:
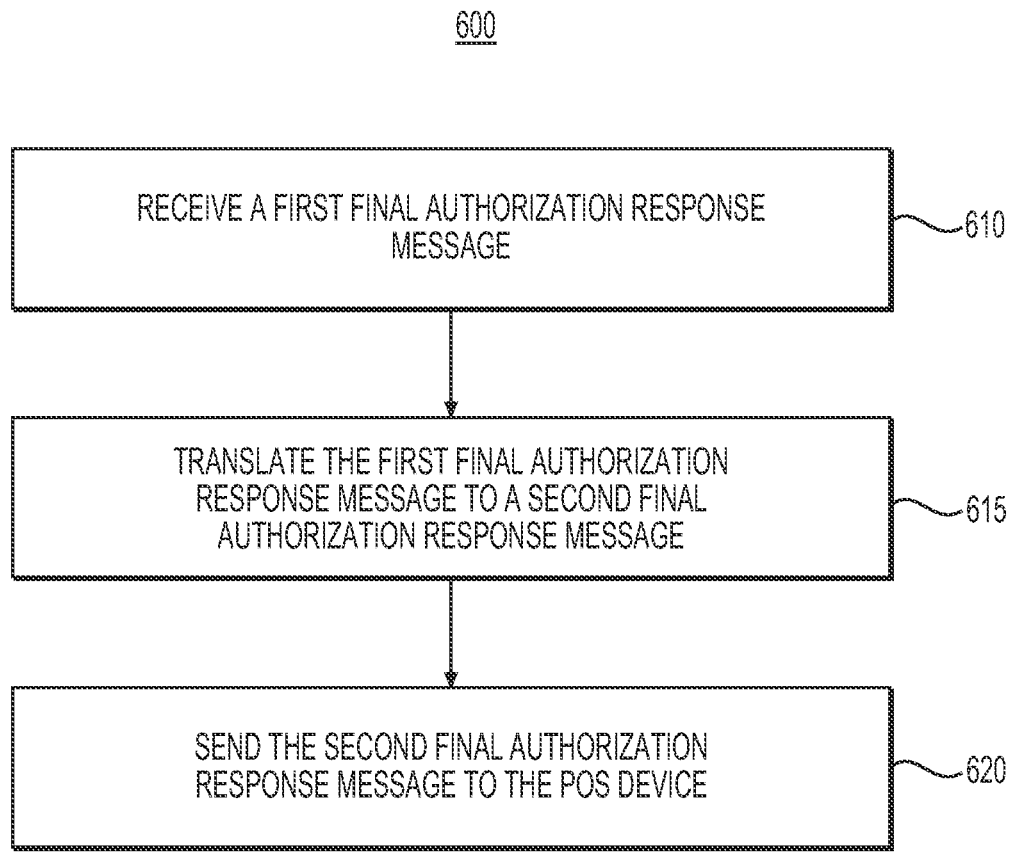
FIG. 6 depicts a flowchart of an exemplary method of translating a first final authorization response message that is single-message system (SMS)-compatible to a second final authorization response message that is dual-message system (DMS)-compatible, according to one aspect of the present disclosure.

FIG. 6 depicts a flowchart of an exemplary method of translating a first final authorization response message that is SMS-compatible to a second final authorization response message that is DMS-compatible, according to one aspect of the present disclosure. In particular, the method 600 may be performed by the message translation module 330 upon receiving a final authorization response message from an entity or a component downstream (e.g., the payment processing computing system 152 of the acquirer processor 150, the payment network 170, etc.). At step 610, the message translation module 330 may receive a first final authorization response message that is SMS-compatible. At step 615, the message translation module 330 may translate the first final authorization response message to a second final authorization response message, the second final authorization response message being DMS-compatible. At step 620, the message translation module 330 may send the second final authorization response message to the POS device 234 (or the merchant system 130). In response to receiving the second final authorization response message, the POS device 234 (or the merchant system 130) may mark the transaction as complete and indicate to the user (e.g., account holder 110 or merchant 130) that the transaction has been authorized and processed.

Figure 7:
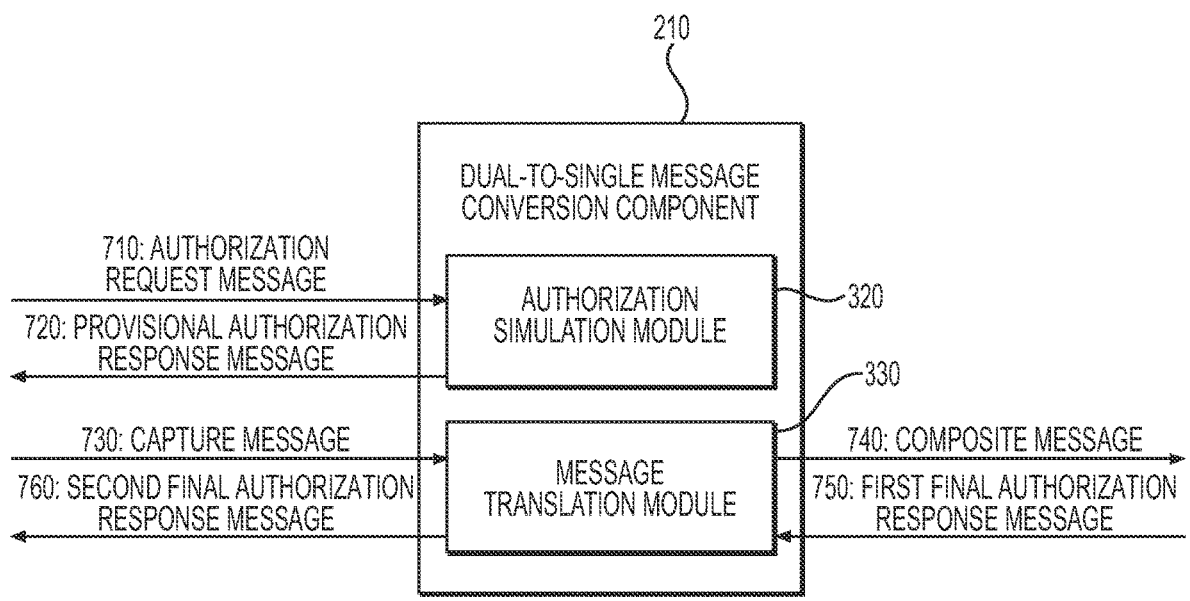
FIG. 7 illustrates a flow of messages being input to and output from an exemplary dual-to-single message conversion component during processing of an electronic transaction, according to one aspect of the present disclosure.

FIG. 7 illustrates a flow of messages being input to and output from an exemplary dual-to-single message conversion component during processing of an electronic transaction, according to one aspect of the present disclosure. In general, the messages shown on the left side of the dual-to-single message conversion component 210 may be DMS-compatible, and the messages shown on the right side of the dual-to-single message conversion component 210 may be SMS-compatible. At step 710, an authorization request message that is DMS-compatible may be received by the authorization simulation module 320 of the dual-to-single message conversion component from the POS device 234 (or the merchant system 130). At step 720, a provisional authorization response message that is DMS-compatible may be sent by the authorization simulation module 320 to the POS device 234 (or the merchant system 130). At step 730, a capture message that is DMS-compatible may be received by the message translation module 330 from the POS device 234 (or the merchant system 130). At step 740, a composite message that is SMS-compatible may be sent by the message translation module 330 to an entity or a component downstream (e.g., the payment processing computing system 152 of the acquirer processor 150, the payment network 170, etc.). At step 750, a first final authorization response message that is SMS-compatible may be received by the message translation module 330 from the entity or component downstream. At step 760, a second final authorization response message that is DMS-compatible may be sent by the message translation module 330 to the POS device 234 (or the merchant system 130).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 8:
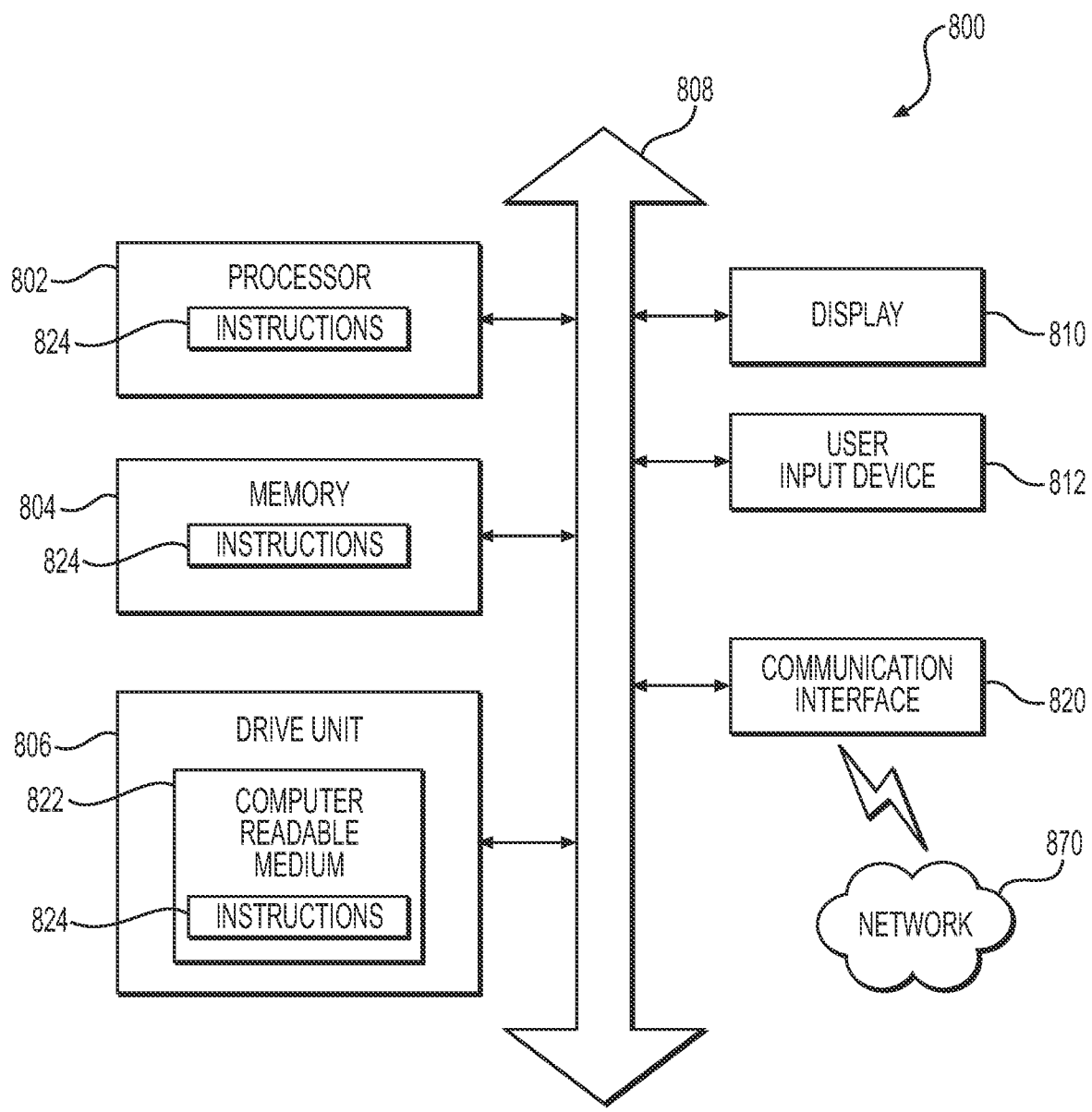
FIG. 8 illustrates an implementation of a computer system that may execute techniques presented herein.

FIG. 8 illustrates an implementation of a general computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may further include a display unit 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control, or any other device operative to interact with the computer system 800.

The computer system 800 may also or alternatively include a disk or optical drive unit 806. The disk drive unit 806 may include a computer-readable medium 822 in which one or more sets of instructions 824, e.g. software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 870, external media, the display 810, or any other components in system 800, or combinations thereof. The connection with the network 870 may be a physical connection, such as a wired Ethernet connection or may be established wirelessly as discussed below. Likewise, the additional connections with other components of the system 800 may be physical connections or may be established wirelessly. The network 870 may alternatively be directly connected to the bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for electronic transaction message conversion, comprising:
   receiving an authorization request message;
   validating the authorization request message;
   storing data associated with the authorization request message in a transaction database;
   sending a provisional authorization response message in response to the authorization request message;
   receiving a capture message in response to the provisional authorization response message;
   validating the capture message;
   translating the capture message to a composite message; and
   sending the composite message to a payment network.

2. The method of claim 1, wherein the authorization request message and the capture message are dual-message system (DMS)-compatible.

3. The method of claim 1, wherein the composite message is single-message system (SMS)-compatible.

4. The method of claim 1 wherein validating the authorization request message comprises one or more of:
   running a mod check on an account number included in the authorization request message; and
   running a credit check on an account holder.

5. The method of claim 1, wherein the data associated with the authorization request message comprises at least one of: a transaction amount, a primary account number (PAN), an expiration date, a merchant identifier, and a bank identification number (BIN).

6. The method of claim 1, wherein the provisional authorization response message is associated with a unique identifier, and further comprising:
   storing the unique identifier in association with the data associated with the authorization request message.

7. The method of claim 6, wherein the capture message comprises the unique identifier and transaction clearing and settlement data.

8. The method of claim 7, wherein validating the capture message comprises:
   retrieving at least a part of the data associated with the authorization request message from the transaction database using the unique identifier in the capture message; and comparing the retrieved data from the transaction database against at least a portion of the transaction clearing and settlement data.

9. The method of claim 7, wherein translating the capture message to the composite message comprises:
converting a first message type indicator of the capture message to a second message type indicator corresponding to the composite message;
merging at least a portion of the data associated with the authorization request message with the transaction clearing and settlement data; and
inserting the second message type indicator and the merged at least the portion of the data associated with the authorization request message and transaction clearing and settlement data in the composite message.

10. The method of claim 1, wherein the authorization request message, the capture message, and the composite message are in ISO 8583 format.

11. The method of claim 1, further comprising:
receiving a first final authorization response message from the payment network, the first final authorization response message being single-message system (SMS)-compatible;
translating the first final authorization response message to a second final authorization response message, the second final authorization response message being dual-message system (DMS)-compatible; and
sending the second final authorization response message to a point of sale (POS) device.

12. The method of claim 11, wherein the first final authorization response message and the second final authorization response message are in ISO 8583 format, and wherein translating the first final authorization response message to a second final authorization response message comprises:
converting a third message type indicator of the first final authorization response message to a fourth message type indicator corresponding to the second final authorization response message; and
inserting the fourth message type indicator in the second final authorization response message.

13. A non-transitory computer readable medium for electronic transaction message conversion, the non-transitory computer readable medium storing instructions that, when executed by one or more processors, cause the one or more processors to perform:
receiving an authorization request message;
sending a provisional authorization response message in response to the authorization request message;
receiving a capture message in response to the provisional authorization response message;
translating the capture message to a composite message; and
sending the composite message to a payment network.

14. The non-transitory computer readable medium of claim 13, wherein the instructions further cause the one or more processors to perform:
validating the authorization request message.

15. The non-transitory computer readable medium of claim 13, wherein the instructions further cause the one or more processors to perform:
validating the capture message.

16. The non-transitory computer readable medium of claim 13, wherein:
the authorization request message is received from a point of sale (POS) device;
the provisional authorization response message is sent to the POS device; and
the capture message is received from the POS device.

17. The non-transitory computer readable medium of claim 16, wherein the instructions further cause the one or more processors to perform:
receiving a first final authorization response message from the payment network, the first final authorization response message being single-message system (SMS)-compatible;
translating the first final authorization response message to a second final authorization response message, the second final authorization response message being dual-message system (DMS)-compatible; and
sending the second final authorization response message to the POS device.

18. A system for electronic transaction messaging conversion, the system comprising:
one or more processors; and
at least one non-transitory computer readable medium storing instructions that, when executed by the one or more processors, cause the one or more processors to perform:
receiving an authorization request message;
sending a provisional authorization response message to a point-of-sale (POS) device;
receiving a capture message generated by the POS device in response to the provisional authorization response message;
translating the capture message to a composite message; and
sending the composite message to a payment network.

19. The system of claim 18, wherein the instructions further cause the one or more processors to perform:
storing data associated with the authorization request message.

20. The system of claim 19, wherein storing the data associated with the authorization request message comprises storing the data associated with the authorization request message in a transaction database.

* * * * *